Nov. 14, 1950      E. D. SMITH      2,529,974
EDDY CURRENT DYNAMOMETER

Filed Jan. 21, 1948      2 Sheets-Sheet 1

INVENTOR.
ERASMUS D. SMITH
BY Bosworth + Sessions
ATTORNEY.

Nov. 14, 1950 — E. D. SMITH — 2,529,974
EDDY CURRENT DYNAMOMETER
Filed Jan. 21, 1948

INVENTOR.
ERASMUS D. SMITH
BY
Bosworth + Sessions
ATTORNEY.

Patented Nov. 14, 1950

2,529,974

UNITED STATES PATENT OFFICE 2,529,974

EDDY CURRENT DYNAMOMETER

Erasmus D. Smith, Shaker Heights, Ohio, assignor to The Electric Products Company, Cleveland, Ohio, a corporation of Ohio Application January 21, 1948, Serial No. 3,645

2 Claims. (Cl. 172—285)

This invention relates to dynamometers and more particularly to electromagnetic power absorption units especially adapted for use in automobile chassis dynamometers, although it is to be understood that the invention is useful wherever a compact, lightweight power absorption unit is required.

A general object of the present invention is the provision of a compact, efficient and readily controllable electromagnetic absorption unit for applying a braking force to a rotating shaft. Other objects include the provision of an absorption unit particularly adapted for use in automobile chassis dynamometers; the provision of an absorption unit of relatively small diameter yet capable of absorbing relatively large amounts of power; the provision of a simple and sturdy absorption unit which can be manufactured economically; and the provision of an electromagnetic absorption unit which is stable in operation and which can be controlled easily and accurately over a wide range of speeds and loads.

Figure 1:
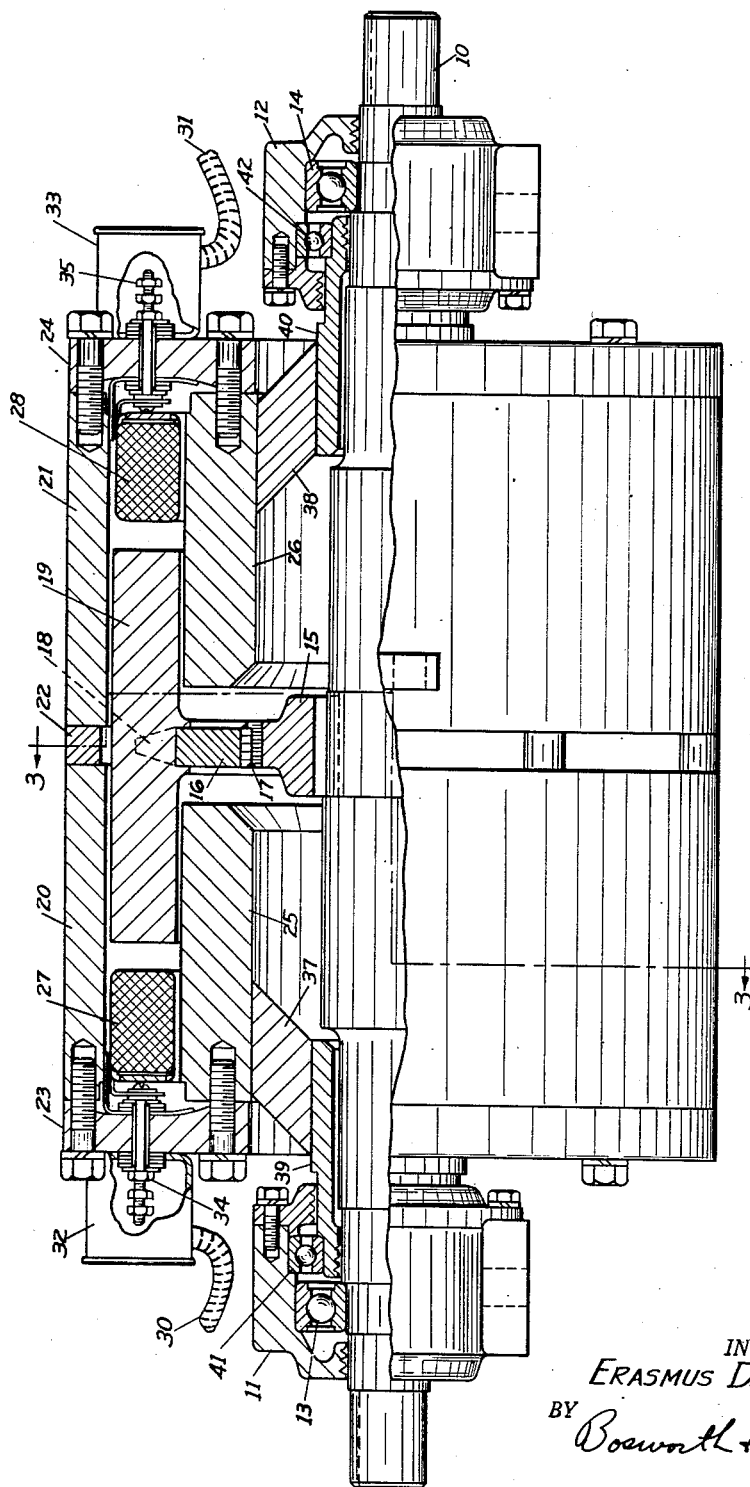
Figure 2:
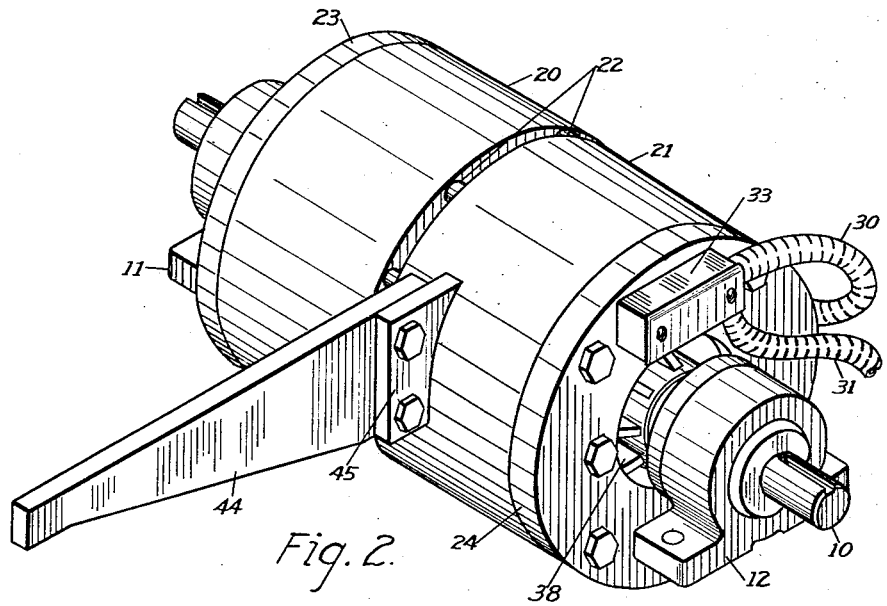
Figure 3:
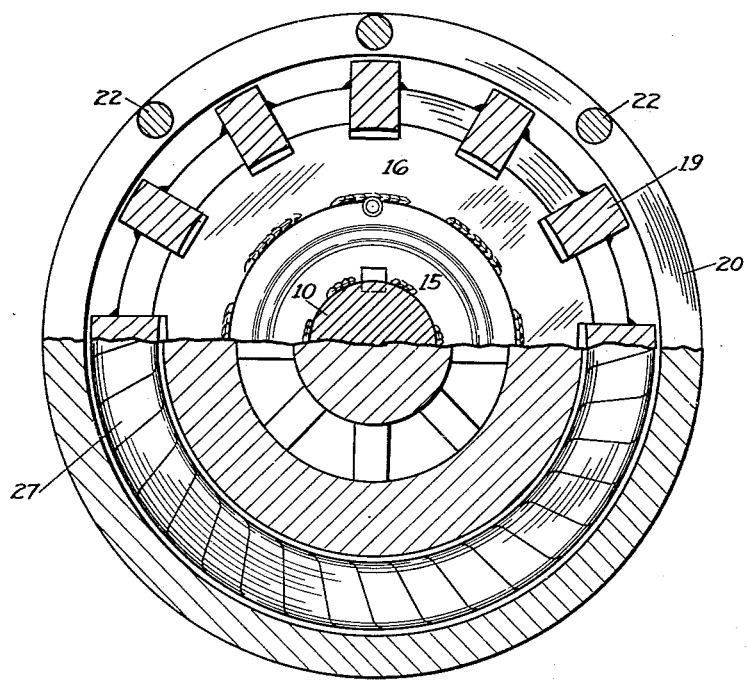

Further objects and advantages of the invention will become apparent from the following description of a preferred form thereof, reference being made to the accompanying drawings in which Figure 1 is a longitudinal view, partially in section, showing a preferred form of my absorption unit; Figure 2 is an isometric perspective view of the unit shown in Figure 1 on a smaller scale; and Figure 3 is a transverse sectional view of the unit taken along the line 3—3 of Figure 1.

Briefly, a preferred form of absorption unit embodying my invention is made up of a stator including two substantially identical, oppositely disposed field structures each providing concentric annular pole faces; coils are provided for creating magnetic fields across the air gap between the concentric pole faces, the fields thus being annular. The rotor preferably comprises a shaft to which the power to be measured is applied, a suitable hub structure to the periphery of which is secured a ring on which the center portions of circumferentially spaced, axially extending bars of ferromagnetic material are mounted, the ends of the bars being disposed within the air gaps. Relative rotation between the rotor and the stator results in the bars cutting the radially extending lines of force in the air gaps and in rapid changes in the flux density at any given point in the cylindrical pole faces, causing the generation of eddy currents in the pole faces; the eddy currents are converted into heat and dissipated into the surrounding atmosphere.

Referring now to the drawings, the absorption unit comprises a rotor shaft 10 to which the load to be measured is connected by any convenient means (not illustrated in the drawings). Shaft 10 is supported in bearing blocks 11 and 12 at opposite ends of the unit by means of suitable ball bearings 13 and 14. The rotor proper is mounted centrally of the shaft and comprises a hub member 15 keyed to the shaft and having a rotor bar support ring 16, preferably composed of non-magnetic material such as bronze, brazed thereto as indicated at 17. The peripheral portion of the ring is tapered as shown at 18 and is notched to receive the rotor bars 19, composed of steel or other ferromagnetic material, which are welded to the ring. The rotor bars are uniformly spaced circumferentially of the ring and extend parallel to the axis of the rotor shaft. For efficient operation, the spaces between the rotor bars are preferably greater than the width of the bars. The optimum spacing with bars of rectangular cross-section is approximately twice the width of the bars, measured at the outer edges of the bars.

To provide the annular magnetic fields in which the opposite ends of the rotor bars operate, the stator is made up of a pair of outer rings 20 and 21, the inner ends of which are held in spaced relation to each other by spacer members 22 welded to the rings 20 and 21. The rings 20 and 21 are bolted to end members 23 and 24, respectively, and inner frame members 25 and 26 are bolted to the end members 23 and 24. These parts provide a field structure having two annular gaps. Coils 27 and 28, disposed between the outer and inner frame members adjacent the opposite ends of the unit, supply the necessary magnetizing forces, energization of these coils creating magnetic fields across the annular air gaps between the members 20 and 25 and 21 and 26, within which gaps the rotor bars 19 are disposed. Energizing currents are supplied to the coils 27 and 28 from an external D. C. supply by conductors 30 and 31 leading to conduit boxes 32 and 33 and thence to the terminal assemblies 34 and 35 which are connected to the coils 27 and 28, respectively.

The frame structure made up of the inner and outer frame members and end members is supported by spaced radially extending support members 37 and 38 which are welded to the inner annular surfaces of the members 25 and 26, and to the outer surfaces of the supporting sleeves 39 and 40, respectively. These sleeves surround the shaft 10, are concentric therewith and are mounted in bearings 41 and 42 which are also carried by the bearing blocks 12. Thus, the rotor shaft is supported for rotation by the bearing blocks, and the stator is also supported for rotation by the bearing blocks. This mounting permits a measurement of the dynamometer torque to be made by means of torque arm 44 suitably secured to the outer frame member 21. The torque may be measured in any conventional manner as by a scale or similar device acted upon by the torque arm 44. The power absorbed by the dynamometer can be calculated from the torque measurement and the speed of rotation of the shaft 10. If desired, the dynamometer can be arranged to give direct horsepower readings in the manner disclosed and claimed in the copending application of William H. Lee and Erasmus D. Smith, Serial No. 709,862, filed November 14, 1946.

It will be evident that when the coils 27 and 28 are energized, magnetic fields are created across the air gaps in which the end portions of the rotor bars are disposed. Upon rotation of the shaft 10, the spaced rotor bars are moved through the air gaps. As any bar approaches any point on one of the pole faces, the flux density at that point gradually increases due to the reduced reluctance of the air gap caused by the presence of the rotor bar. The flux density increases to a maximum and then decreases as the rotor bar passes the point; this action is repeated with each rotor bar. Thus, at all points on the pole faces opposite the paths of the rotor bars, the flux density changes at rates determined by the speed of rotation of the shaft. The changes in flux density generate alternating voltages which create eddy currents in the pole faces, the eddy currents in turn being converted into heat and dissipated. The load absorbed by the dynamometer at any given speed can be varied by controlling the currents in the coils 27 and 28.

When the absorption unit is used in a chassis dynamometer, the shaft 10 ordinarily is directly connected to the rolls driven by the rear wheels of the vehicle being tested, and preferably the absorption unit is positioned beneath the vehicle. The present unit is particularly adapted for such purposes because the arrangement of the rotor bars parallel to the shaft makes a very compact structure in which relatively large torque can be absorbed in a device of relatively small over-all diameter.

As shown in the drawing, the inner pole members 25 and 26 are preferably of greater thickness than the outer frame members 20 and 21. Preferably the proportion is such that the inner members have substantially the same amount of iron in them as the outer members. The field structure and the rotor are preferably designed so that all of the ferromagnetic parts will become saturated at about the same time, and the machine preferably is designed to operate at flux densities well below saturation. Thus uniformity of operation and ease and smoothness of control are obtained. Inasmuch as eddy currents are developed in both the inner and the outer pole faces, efficient use is made of all of the iron in the structure. Little heat is generated in the rotor bars, hence the bars are not likely to warp and the clearances between the rotor bars and the inner and outer pole faces can be small. The devices can be manufactured at relatively low cost because the principal components are all round and can be produced readily and assembled accurately and economically by welding or the like.

It will be noted that the outer members 20 and 21 are secured together by the spacers 22 only at widely spaced points. This arrangement provides a passageway for air to be discharged from the absorption unit, the rotor bars 19 acting in the manner of impellers of a centrifugal blower to draw air into the interior of the unit through the spaces between the members 37 at one end and members 38 at the other end. The discharged air thus carries away the heat generated in the operation, and the passage of air over the members 37 and 38 prevents transmission of substantial amounts of heat to the supporting bearings.

Those skilled in the art will appreciate that various changes and modifications can be made in the invention without departing from the spirit and scope thereof. Accordingly, it is to be understood that my patent is not limited to the preferred form of the invention disclosed herein or in any manner other than by the scope of the appended claims.

I claim:

1. An eddy current dynamometer comprising a field structure made up of a pair of oppositely facing aligned outer frame members, spacers interposed between the inner ends of said outer frame members to provide spaces between them, a pair of oppositely facing cylindrical inner frame members disposed within said outer frame members and cooperating therewith to provide a pair of axially spaced aligned annular air gaps, end members for securing said inner and outer frame members together, a rotor within said field structure comprising a shaft, bearings adjacent the ends of said field structure for supporting said shaft, a hub on said shaft disposed centrally of said field structure, a plurality of axially extending circumferentially spaced rotor bars supported by said hub and having end portions disposed in said air gaps, and means for supporting said field structure concentrically of said shaft, said supporting means providing openings at the ends of said field structure between said shaft and said inner frame members whereby rotation of the rotor will draw cooling air into the interior of said field structure through said openings and discharge it through the spaces between the ends of said outer frame members.

2. An eddy current dynamometer comprising a field structure made up of a pair of oppositely facing aligned cylindrical outer frame members, spacers interposed between the inner ends of said outer frame members to provide spaces between them, a pair of oppositely facing cylindrical inner frame members disposed within said outer frame members and cooperating therewith to provide a pair of axially spaced aligned annular air gaps, and members for securing said inner and outer frame members together, a rotor within said field structure comprising a shaft, bearings adjacent the ends of said field structure for supporting said shaft, a hub on said shaft disposed centrally of said field structure, a plurality of axially extending circumferentially spaced rotor bars supported by said hub and having end portions disposed in said air gaps, and means for supporting said field structure comprising a plurality of radially extending spaced supporting members extending inwardly from said inner frame members to bearings disposed adjacent said shaft bearings, whereby rotation of the rotor will draw cooling air into the interior of said field structure through the spaces between said supporting members and discharge it through the spaces between the ends of said outer frame members.

ERASMUS D. SMITH.

REFERENCES CITED

The following references are of record in the file of this patent:

UNITED STATES PATENTS

| Number | Name | Date |
|---|---|---|
| 2,073,926 | Fraser | Mar. 16, 1937 |
| 2,220,032 | Winther et al. | Oct. 29, 1940 |
| 2,306,582 | Winther et al. | Dec. 29, 1942 |
| 2,367,163 | Winther | Jan. 9, 1945 |

FOREIGN PATENTS

| Number | Country | Date |
|---|---|---|
| 418,443 | Great Britain | Oct. 22, 1934 |